N. H. BUNDY.

Steam Radiators.

No. 6,063. Reissued Sept. 22, 1874.

Witnesses:

E. H. Williams

J. W. Robinson

INVENTOR:

Nelson H. Bundy

Per Edw. E. Lumby

Atty.

UNITED STATES PATENT OFFICE.

NELSON H. BUNDY, OF NEW YORK, N. Y., ASSIGNOR, BY MESNE ASSIGNMENTS, TO ABNER A. GRIFFING.

IMPROVEMENT IN STEAM-RADIATORS.

Specification forming part of Letters Patent No. 130,013, dated July 30, 1872; reissue No. 6,063, dated September 22, 1874; application filed September 8, 1873.

*To all whom it may concern:*

Be it known that I, NELSON H. BUNDY, of the city, county, and State of New York, have invented certain Improvements in the Construction and Arrangement of Steam-Radiators for Heating Purposes, of which the following is a specification:

My invention relates to cast-iron double-pipe radiators, in which the vertical passages are convexo-convex in cross-section, and are joined to a transverse passage at their upper ends, and to a hollow cylinder or tubular neck at their lower ends; and consists in arranging the convexo-convex pipes with reference to each other, so that their longer diameters are substantially parallel, as shown.

My improvement has two objects: First, to combine enlarged radiating-surface with economy of space, so that double or loop-pipe radiators may be set comparatively close together in the radiator-base or steam-chest; and, secondly, to facilitate the successful casting of the pipes, and thus cheapen the cost of their manufacture. I accomplish the latter object by using cores strongest in the direction in which they are subjected to the greatest strain while the operation of casting is going on, which I am enabled to do by reason of the form and arrangement of my pipes with reference to each other, and I strengthen the casting by a web connecting the two pipes together.

Figure 1:
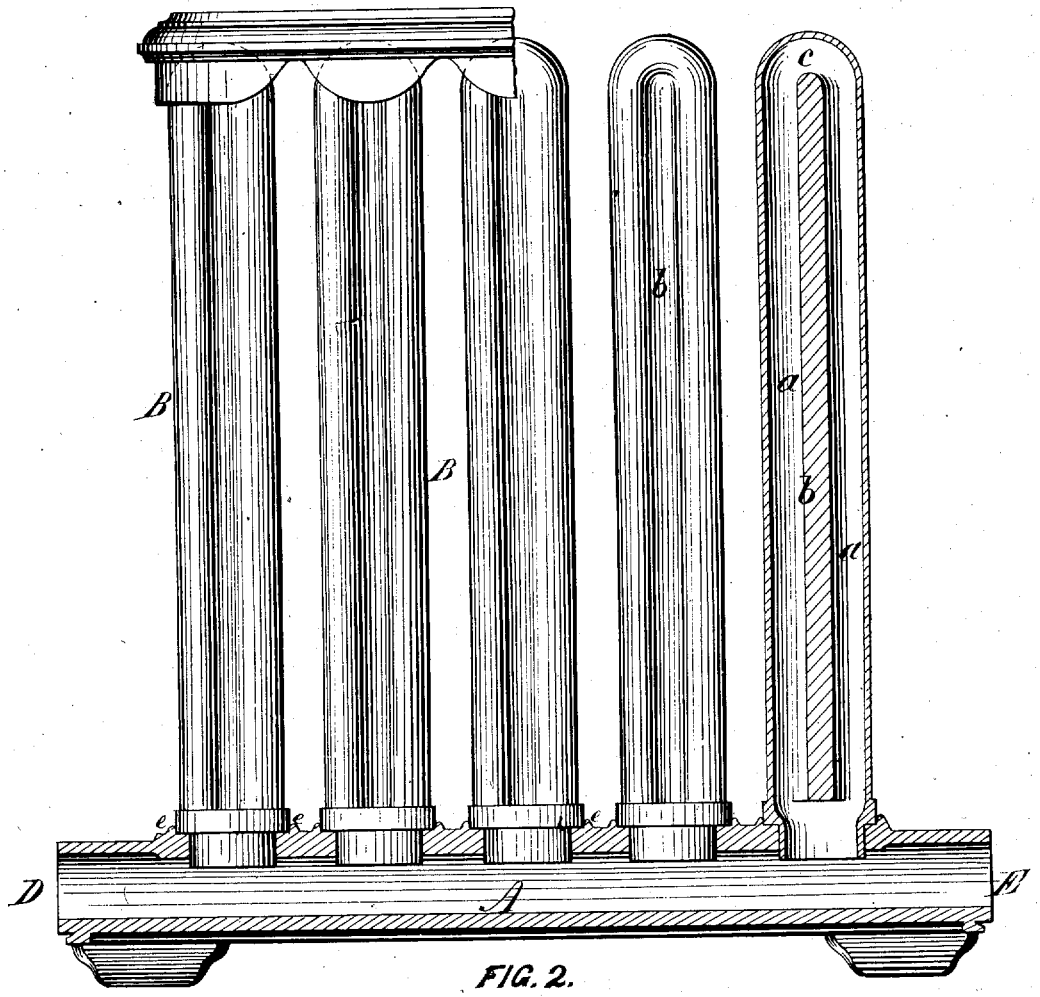
Figure 2:
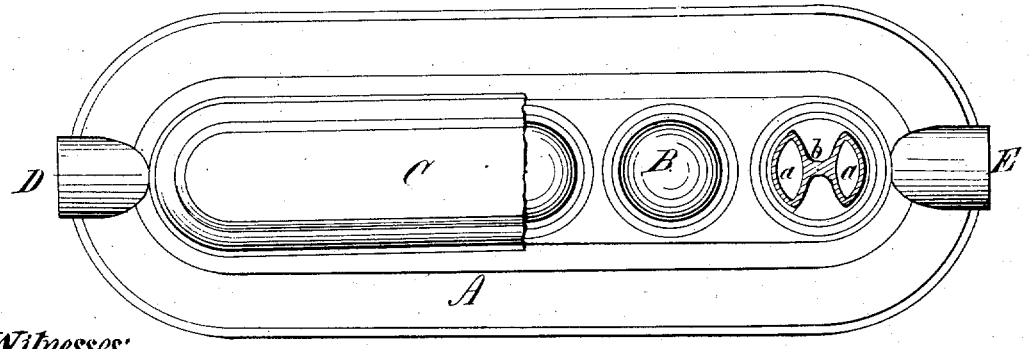

In the accompanying drawings, Figure 1 is a partly sectional side elevation of a radiator system embodying my improvement; and Fig. 2, a top view of the same, also partly in section.

The same parts are indicated in both views by like letters of reference.

The steam-chest A, constituting the base of the system of radiating pipes, is provided with circular openings for the reception of the tubular necks *d* of the upright radiators B.

The term "radiator" is commonly applied to the steam-chest and system of pipes as a whole, but, for convenience of description, I use it to designate each upright double pipe.

To proceed, then, my radiators B are cylindrical at the lower end, and are there screwed into or secured to the base A. Just above the base each radiator separates into two longitudinally-parallel legs or passages, *a a*, the outer sides of which present, in transverse section, concentric arcs of a circle having the same center as the cylinder *d*. The inner or adjacent sides of the passages are of the form of two reversed arcs, slightly flatter than those forming the outer sides of the said passages.

A convexo-convex shape is consequently given to the passages, and a very large amount of radiating-surface thereby obtained, while at the same time the radiators can be set into the base or steam-chest as close together as the strength of the top of the base will permit the holes in it to be bored.

In addition to these advantages the successful casting of double-tube radiators is greatly facilitated, by the fact that the convexo-convex cores for the passages stand, when in the mold, with their longer diameters in a vertical position. They thus present a smaller amount of surface to be acted upon by the molten metal, and are thus less exposed to be sprung or broken in the middle, being strengthened in the direction in which they are called upon to resist the upward thrust of the molten metal.

The passages *a a* are connected at the top by the curved passage *c*, the radiator being rounded off at the upper end, as shown in Fig. 1. The legs of the radiator are connected in the casting by the web *b*, in addition to their connection at both ends.

The upper ends of the radiators may be covered by a molded top, C, if desired.

In operation, the radiators are filled with steam, which is thus exposed to condensation. When more rapid condensation takes place in one passage of a radiator, the cooled steam falls by its superior gravity, and its place is supplied through the curved connection at the top by hotter steam from the other passage, and a continuous circulation is thus established.

I claim as my invention—

1. A double-pipe radiator having two vertical passages of convexo-convex shape, communicating with each other at their upper ends, and connected at their lower ends to a hollow cylinder or tubular neck, the two vertical convexo-convex passages being arranged, with reference to each other, as shown, so that their longer diameters are substantially parallel, as and for the purposes set forth.

2. The radiator-pipe, cast with separate convexo-convex passages *a a*, provided with, and in combination with, the connecting-web *b* and communication *c* between the passages at one end thereof, substantially as herein specified.

NELSON H. BUNDY.

Witnesses:
ARMINIUS AIKIN,
ARMINIUS AIKIN, Jr.